United States Patent

Kimmel et al.

[15] 3,661,697

[45] May 9, 1972

[54] MULTI-PLY PACKAGING MATERIAL OF POLYETHYLENE, AMYLOSE AND PAPER

[72] Inventors: Ellsworth E. Kimmel; Austin H. Young, both of Decatur, Ill.

[73] Assignee: A. E. Staley Manufacturing Company, Decatur, Ill.

[22] Filed: Jan. 2, 1969

[21] Appl. No.: 791,860

Related U.S. Application Data

[63] Continuation of Ser. No. 378,984, June 29, 1964, abandoned.

[52] U.S. Cl. ..................................161/250, 117/76, 117/84, 117/156, 117/165, 161/267

[51] Int. Cl. ..................B22b 9/06, B32b 27/10, C08h 17/26

[58] Field of Search ..................260/17.4, 9, 233.3; 161/247, 161/249, 250, 267; 99/171, 174; 117/76, 84, 155, 156, 165

[56] References Cited

UNITED STATES PATENTS

| | | | |
|---|---|---|---|
| 3,247,290 | 4/1966 | Werkman et al. | 260/897 |
| 3,255,042 | 6/1966 | Schnell et al. | 260/233.3 X |
| 3,312,641 | 4/1967 | Young | 260/17.4 |
| 3,188,265 | 6/1965 | Charbonneau | 161/247 |

OTHER PUBLICATIONS

Kaplan, Paul; " Potential Industrial Use of Amylose," Cereal Science Today, 3(8), pp. 206–209, Oct. 1958

*Primary Examiner*—Robert F. Burnett
*Assistant Examiner*—Mark A. Litman
*Attorney*—Charles J. Meyerson

[57] ABSTRACT

A water-resistant, grease-resistant, oxygen-resistant multi-ply structure comprising, bonded together, smooth continuous layers of polyolefine and amylose, and paper bonded to either the polyolefine or amylose layer.

5 Claims, No Drawings

MULTI-PLY PACKAGING MATERIAL OF POLYETHYLENE, AMYLOSE AND PAPER

This application is a continuation of application Ser. No. 378,984, filed June 29, 1964, now abandoned.

This invention relates to a new water-resistant, grease-resistant, oxygen-resistant packaging material, which comprises a paper base, a smooth, continuous, uniform layer of polyolefinic material and a smooth, uniform, continuous layer of amylose. More specifically, this invention relates to a new packaging material of the class mentioned, in which the polyolefin is polyethylene and which has at least one surface of the paper base bonded to a continuous layer of a first polymeric material, a layer of a material selected from the group consisting of said paper base and said first polymeric material bonded to a continuous layer of a second polymeric material, wherein said first polymeric material and said second polymeric material are each a different member selected from the group consisting of amylose and polyethylene.

As is well-known, paper is by far the most widely used packaging material. Recently paper has been coated with a polyolefinic material, such as polyethylene, in order to prevent the passage of moisture through the paper. Coatings of this type have eliminated one of the major drawbacks to the use of paper wrapping materials. However, paper (even coated with a polyolefinic material) is extremely permeable to the passage of greases (fats and oils) and oxygen. A greasy, aesthetically undesirable texture is imparted to paper, which detracts from the marketability of paper-packaged meats, nut meats, potato chips, dog food and other materials, which are greasy or tend to exude a greasy substance. The polyethylene side of polyethylene coated paper has itself a waxy texture which many people consider undesirable. The relatively high oxygen permeability of polyolefin-coated paper is often undesirable since it cuts down the storage life of perishable goods. Polyethylene coated paper lacks sufficient abrasion resistance to permit its use in packaging of abrasive products such as dog food pellets.

The principal object of this invention is to provide water-resistant, grease-resistant, oxygen-resistant paper. Other objects will appear hereinafter.

Although various references have suggested polyolefinic material bearing an amylaceous coating none of these references disclose a paper base bearing a continuous layer of amylose and a continuous layer of polyolefinic material. For example, U.S. Pat. No. 3,076,720 discloses that the printability or gluability of an activated polyolefinic surface, which may be laminated to a cellulosic web, is preserved if the surface is coated with a non-polymerizing, polar, hydrophilic aqueous coating at coating weights of from 0.07 to 1.4 pound per 1,000 sq. ft. of the polyolefinic material. The patentees indicate that the aqueous phase top-coat when applied within the prescribed coating level to the activated polyolefinic surface forms a porous superstructure of protection over the activated polyolefinic surface. As a result of the "lattice-like" porous nature of the top-coat, there is accessible activated polyolefinic surface which retains its "readily efficient receptive nature." A porous structure of the type described in this patent would be virtually useless for rendering a polyethylene surface grease-resistant or oxygen impermeable.

Although the patentees indicate at column 2, lines 57–59 that when there is an excess of protective topcoat (more than 1.4 pounds per 1,000 sq. ft. of surface) the activated areas of the polyolefinic material are entirely masked and covered and thus receptivity is lost, we have found that when using amylose to coat polyethylene, there is no loss of gluability or printability at a coating weight in excess of 1.4 pounds per 1,000 sq. ft. of polyethylene. We believe that this is due to the continuous nature of our amylose layer, which can in effect be used as the outer ink-receptive and/or glue-receptive surface of the polyethylene layer.

Starch, such as hydroxyethyl starch, along with a wide variety of other materials, is disclosed by the patentees as being a suitable topcoat material. While it is possible to render polyethylene grease-resistant with a sufficiently heavy coating of starch (about 3 to 6 pounds of hydroxyethyl starch per 1,000 sq. ft. of polyethylene), the coating is so brittle that slight flexing or bending of the polyethylene films destroys the grease-resistance. We believe that the brittleness of the heavy starch coating is due in large measure to the high concentration of amylopectin (the branched component of starch). If more than 25 percent by weight of the amylaceous material is amylopectin, the amylaceous material cannot be used at a coating weight sufficient to impart grease-resistance to polyolefin without the amylaceous coating being so brittle that slight bending or flexing destroys the grease-resistance and oxygen-resistance of the film.

We have now found that the objects of our invention can be accomplished by providing paper with a smooth, uniform, continuous coating of amylose and a smooth, uniform, continuous coating of a polyolefinic material. These multi-ply structures can be prepared by any of the following techniques: (1) applying an amylose coating on to one side of the paper and a polyolefinic coating to the other side, (2) applying an amylose coating to the polyolefin side of a polyolefin-coated paper (i.e. the polyolefin layer is a subbing layer) or (3) applying a polyolefin coating to the amylose side of an amylose-coated layer (i.e. the amylose layer is a subbing layer). The coatings can be applied to the paper by laminating preformed films or by applying suitable film-forming compositions.

For the purpose of this invention, the term "polyolefin" or "polyolefinic material" refers to polymers of hydrocarbon monomers, such as ethylene, propylene, butene-1, styrene, etc. wherein the hydrocarbon monomer or monomers comprise at least 50 mole percent of the monomeric units in the polymer. The various polymers of ethylene include the so-called low-density, medium-density and high-density homopolymers and copolymers. Suitable comonomers include ethyl acrylate, acrylic acid, vinyl acetate, vinyl chloride, etc.

For the purpose of this invention, the term "amylose" refers to the amylose resulting from the separation of amylose and amylopectin, or the whole starch which is composed of at least 75 percent amylose. Commercially available sources of amylose include "Nepol" amylose (the amylose fraction of corn starch) and "Superlose" (the amylose fraction of potato starch). If desired, high-amylose natural starches containing at least 75 percent amylose can be simulated by mixing corresponding concentrations of separated amylose with separated amylopectin or the currently available high-amylose corn starches ("Amylomaize" or "Amylon" containing approximately 54 percent amylose or "Amylon VII" containing up to 70 percent amylose) having less than 75 percent amylose can be mixed with sufficient separated amylose to bring the total amylose concentration up to at least 75 percent by weight of the amylaceous material. Preferably, the amylopectin content of the amylose material is less than 20 percent by weight of amylose since the higher the concentration of amylose, the better the flexibility and strength of the amylose film. As explained below, it is preferred that the amylose be underivatized for best results. If desired, unretrograded cold-water-soluble amylose of the type described in U.S. Pat. No. 3,086,890 can be used.

Starch chemists generally consider that underivatized, retrograded amylose in either film or particulate form dissolves in water at a minimum temperature of about 120° C. to 135° C. Derivatization of amylose with monofunctional etherifying and esterifying agents, such as ethylene oxide, propylene oxide, acrylonitrile, vinyl acetate, acetic anhydrides, etc. lowers the temperature at which amylose dissolves in water and inhibits the subsequent ability of amylose to retrograde. As the degree of substitution (D.S.) of uniformly derivatized amylose increases from 0.001 to 0.6 or higher (depending on the functional group), the amylose derivative usually becomes water-soluble at progressively lower temperatures and has less of a tendency to retrograde from solution.

Amylose derivatives soluble in water at ambient temperature are less desirable than underivatized amylose since the water or moisture in some of the material to be wrapped, such as meat, or on the hands of the person doing the wrapping or handling the package, etc. tends to dissolve part of the amylose derivative layer thereby destroying the grease-resistance and oxygen-resistance of the packaging material and weakening the film. This problem can be reduced to a minimum by sandwiching the water-soluble amylose derivative between the paper base and the polyolefinic layer. Amylose derivatives having a maximum D.S. of 0.15 and which are water-insoluble at 40° C. can be utilized effectively without sandwiching the water-insoluble amylose derivative between paper base and polyolefinic layer. A number of these water-insoluble amylose derivatives are disclosed in U.S. Pat. No. 3,038,895. All of these amylose derivatives are deemed to be included in the term "amylose."

While we have indicated in the preceding paragraph that amylose derivatives, which are water-soluble at ambient temperatures, have certain drawbacks due to the tendency of layers of said derivative to weaken on coming in contact with water, such water-soluble amylose derivatives have an undesirably reduced ability to form retrograded layers when compared with underivatized amylose. Retrograded amylose is characterized by having a much lower solubility in water than non-retrograded amylose. The low solubility of retrograded amylose is believed to be caused by a high degree of hydrogen bonding which in turn causes compaction of the amylose molecules and the formation of highly crystalline areas. The increased density and crystallinity of retrograded amylose greatly decreases its water-solubility and oxygen permeability. The retrogradation (i.e. the formation of crystalline amylose) usually takes place concurrently with the precipitation of rigid amylose gels from aqueous solution. However, exposure to atmospheric water vapor will convert unretrograded, superficially dry, underivatized amylose into the retrograded state. This is because the substituents on the amylose backbone decrease the hydrogen bonding capability of the amylose, thereby decreasing the crystallinity of the subsequently formed layers. This is undesirable since the most highly retrograded amylose layers have the best oxygen barrier properties. The oxygen barrier properties of an amylose layer drops off rapidly as the degree of substitution of an amylose derivative increases. For this reason, we prefer to employ underivatized amylose when the oxygen barrier property of the final structure is of dominant interest. The grease-barrier property of amylose layers is generally less affected by the degree of substitution of an amylose derivative.

The amylose film, whether prepared as a self-supporting free film or applied so as to form a film on paper or on a preformed polyethylene film surface, can be and is preferably plasticized. Suitable amylose plasticizers include polyhydric alcohols such as glycerol, sorbital, 1,1,1-trimethylol propane, 1,2-propylene glycol, 1,2,6-hexanetriol, diglycerol, etc.; amino-alcohols such as triethanolamine, diethanolamine, ethanolamine, N-methyl diethanolamine, N-cyanoethyl diethanolamine, etc.; hydroxyalkyl amides such as N,N-di(hydroxyethyl) lactamide, N-(hydroxyethyl) lactamide, N,N-di(hydroxyethyl) formamide, N,N-di(hydroxyethyl) acetamide, N,N-di(hydroxyethyl) methane sulfonamide, N-(hydroxyethyl)-N,N',N',N'',N''-pentamethyl phosphoramide, etc.; quaternary ammonium compounds such as choline chloride, tetraethyl ammonium chloride, etc. A number of other suitable plasticizers are also disclosed in commonly assigned applications, Ser. Nos. 288,897; 323,570; 325,145 and 345,593 filed June 19, 1963, Nov. 14, 1963, Nov. 20, 1963 and Feb. 18, 1964 respectively, now U.S. Pat. Nos. 3,314,810; 3,318,715; 3,320,081 and 3,312,559. One or more of these plasticizers can be used in a weight ratio of amylose plasticizer to amylose (dry solid basis) of about 5:95 to 60:40. Under most conditions, the plasticizer or plasticizers are used in a concentration of from 10 to 40 parts by weight with correspondingly 90 to 60 parts by weight amylose.

As indicated in commonly assigned application Ser. No. 288,869, filed June 19, 1963, now U.S. Pat. No. 3,312,641, polyvinyl alcohol is an extremely useful polymeric plasticizer for amylose. Preferably, less than about 20 mole percent of the monomeric units in the polyvinyl alcohol contain acetyl groups, since the higher the concentration of acetyl groups, the poorer the compatibility of polyvinyl alcohol and amylose. Polyvinyl alcohol can be used alone or together with one or more of the above-mentioned plasticizers. In those cases, where the oxygen barrier properties of the amylose layer are most critical, it is preferred to use polyvinyl alcohol as the plasticizer. Unlike the various non-resinous plasticizers which tend to reduce the oxygen barrier properties of amylose, polyvinyl alcohol has no deleterious effects. In grease-proofing applications neither polyvinyl alcohol nor the non-resinous plasticizers diminish the grease-proofing effect of amylose.

Polyvinyl alcohol is the plasticizer of choice for the above reasons and for the additional reason that its plasticizing effect is not lost when the amylose layer is in direct contact with paper. The fugitive nature of prior art amylaceous plasticizers is well known by starch chemists. It has now been found that even the best non-resinous amylose plasticizers, whose plasticizing effect is not fugitive when used to plasticize a self-supporting amylose film, tend to embrittle an amylose film that is bonded directly to paper. These same non-resinous amylose plasticizers tend to embrittle amylose-polyvinyl alcohol layers which are bonded directly to paper. For these reasons, polyvinyl alcohol is the preferred plasticizer in our invention and it is preferred to use polyvinyl alcohol as the sole amylose plasticizer when the amylose layer is bonded directly to paper.

Self-supporting amylose films, which are large in two dimensions and small in the third dimension (i.e. two dimensions are each at least 100 times larger than the third dimension), can be prepared by any of the prior art techniques, such as those described in any of U.S. Pat. Nos. 2,603,723 to Wolff et al.; 2,903,336 to Hiemstra et al.; 2,973,243 to Kudera; 3,030,667 to Kunz, etc. In these processes, the amylose plasticizer (in either the dry form or dissolved in water) is added to a suitable aqueous solution of amylose, dissolved, for example, in aqueous alkali, in hot water at essentially neutral pH, etc. The amylose solution is then cast on a suitable substrate, such as a moving belt, or extruded into a coagulating (acidic or salt) bath. In this way, the amylose is recovered from the aqueous solution as a film by the precipitation of the amylose film from the solvent or by evaporation of the solvent during drying. If desired, the plasticizer can be added to the amylose prior to the dissolution of the amylose.

Amylose films can also be prepared by extruding a relatively dry mixture of amylose and amylose swelling agent (water and/or plasticizer). By relatively dry, we mean that the amylose swelling agent has been absorbed by the amylose prior to the extrusion step. This technique is described in detail in commonly assigned application Ser. No. 244,127, filed Dec. 12, 1962 now abandoned.

As indicated above, the multi-ply structures of this invention can be prepared by (1) applying an amylose coating on to one side of paper and a polyolefinic coating to the other side of the paper, (2) applying an amylose coating to the polyolefin side of a polyolefin coated paper or (3) applying an amylose coating to the amylose side of an amylose coated paper to such an extent that the mixture is not fluid. The coatings can be applied to the paper by laminating a preformed film or by applying a suitable film-forming composition.

Excellent results have been obtained by applying an aqueous solution of amylose to either the polyolefin side or the paper side of the commercially available polyethylene coated-paper of the type described in U.S. Pat. No. 3,076,720, wherein the polyethylene has been extrusion-coated on to the paper. The amylose is deposited by means of a roll applicator, preferably with an air knife, in essentially the manner described in commonly assigned application Ser. No. 296,660, filed July 22, 1963, now abandoned which discloses and claims applying an amylose coating to paper. In somewhat greater detail, this process comprises providing an aqueous slurry of about 1 percent to 15 percent by weight amylose, preferably 6–12 percent by weight amylose, and then dissolving the amylose in a continuous heat exchange unit, such as a Votator or any of the common types of starch cookers. The higher the concentration of amylose in the coating composition, the heavier the coating of amylose that can be applied to the polyolefin or paper in a single pass and correspondingly the more grease-resistance and oxygen-resistance imparted to the final product. However, the higher the concentration of amylose the higher the viscosity of the coating composition and the greater the tendency of the amylose to gel prematurely in the coating pan or before the smoothing step. In this procedure, the dissolved amylose is continuously discharged into a coating pan which is maintained above the gelation temperature of the amylose solution (typically 60°–100° C.). The roll applicator, which can be heated if desired, almost immediately reaches the temperature of the amylose solution in the coating pan as the roll applicator revolves. The non-water receptive applicator roll transfers the hot amylose solution in an ungelled state to the web, which is typically moving at about 50 to 2,500 feet per minute. The coating is immediately smoothed before the overlying coating composition gels by passing said coated web between a roll surface and a blast of air (air knife) with the coated side of the web being exposed to the blast of air. The amylose gels and concurrently with gelation the amylose retrogrades from the aqueous solution. The web can then be dried and/or a second coat of amylose applied.

Aqueous amylose coating compositions can be applied to the polyolefin surface with a Bird applicator, Gardner applicator, doctor blade, Nordson Airless spray applicator, wire wrapped rod, Champion knife coater, trailing blade coater, size press, etc. Unlike coating paper there is no tendency for the amylose solution to penetrate into the polyolefin surface. The impenetrability of polyethylene, for example, makes it necessary to activate the polyethylene The polyethylene can be activated (1) by flame treatment as disclosed in U.S. Pat. Nos. 2,632,921; 2,684,087 and 2,683,894, (2) by chemicals such as disclosed in U.S. Pat. No. 2,668,134; by application of polyethylene imine, by ozone treatment etc., (3) by glow discharge as disclosed in U.S. Pat. Nos. 2,910,723 and 3,018,189, (4) by extrusion as disclosed in British Pat. No. 810,723, etc.

Relatively dry amylose compositions can be extruded as a hot film directly onto paper or onto the polyolefin surface of a polyolefin coated paper utilizing the techniques described in the aforementioned application Ser. No. 244,127.

If desired, preformed amylose films can be laminated onto the polyolefin surface of polyolefin coated paper using polyethylene imine as a tie coat in a manner similar to that described in U.S. Pat. No. 2,828,237.

Generally, the above-described coating techniques are most applicable to applying amylose to either the polyethylene side or paper side of commercially available polyethylene coated paper. Excellent results have also been obtained by applying a polyolefin coating (by extrusion, for example) to the amylose side of amylose coated paper.

In general, the amylose film layer (amylose and other additives, such as plasticizer) of the multi-ply structure must weigh at least 0.75 pounds per 1,000 square feet of paper in order to form an effective grease-resistant layer, when the amylose layer has been applied to the polyolefin layer. Higher concentrations of amylose are sometimes necessary when the amylose layer is applied directly to the paper in order to avoid the presence of pinholes in the amylose layer. About 1.5 pounds of the amylose film layer per 1,000 square feet of paper assures the desired barrier properties when the amylose layer is bonded directly to unsized paper. Accordingly, it is usually preferable to have the amylose layer as the outside layer with the polyolefin bonded directly to the paper.

Other advantages of the multi-ply structure with the amylose layer on the polyethylene side and the polyethylene on the paper are the following: (1) The fugitive nature of non-resinous amylose plasticizers is minimized by having a barrier layer between the amylose layer and the paper (For reasons not now identified, the paper seems to enhance the fugitive nature of such plasticizers.). (2) The amylose layer imparts to the polyethylene side of polyethylene coated paper a much more aesthetically desirable texture (The paper then has essentially the same texture on its coated and uncoated sides.). (3) The amylose layer is sufficiently abrasion resistant that the multi-ply product can be used to package abrasive material, such as dog food pellets. (4) Polyethylene-coated paper can be obtained commercially.

The following examples are merely illustrative and should not be construed as limiting the scope of our invention.

EXAMPLE I

An aqueous solution of amylose was prepared by heating to 155° C. an 11 percent solids aqueous slurry of 7.2 parts by weight corn amylose, 0.8 parts by weight corn amylopectin and 3 parts by weight polyvinyl alcohol having about 2 acetyl groups per each 100 monomeric units. A starch cooker of the type described in U.S. Pat. No. 3,101,284 was used. The solution was discharged into the coating pan of an air knife coater having a non-water absorptive applicator roll partially immersed in the coating solution in the pan. The amylose composition, while the amylose was in an ungelled state, was picked up by the applicator roll and transferred from the surface of the roll to the polyethylene side of a commercially available corona discharge treated polyethylene coated natural kraft paper web (the polyethylene layer being approximately 0.50 mils thick), which was moving at 250 feet per minute. Immediately thereafter, before the overlying amylose coating composition gelled, the coating was smoothed by passing the paper web between a roll surface and an air blast from a jet, the air knife. As the coated paper dried the amylose gelled and concurrent with the gellation of the amylose layer, the amylose retrograded.

The amylose layer weighed 1.4±0.3 pounds per each 1,000 square feet of polyethylene coated paper. The multi-ply structure had excellent grease-resistance. Furthermore, the oxygen permeability was 0.79 ccs./24 hours/100 square inches under one atmosphere of pressure. The oxygen permeability of this multi-ply structure is approximately the same (0.5–1.0 ccs./24 hours/100 square inches) as that obtained by applying polyvinylidene chloride from an organic solvent to uncoated paper at a coating weight of 4 pounds per 1,000 square feet of paper.

A 4 inches × 4 inches square of paper passed the standard grease-proofing test of the Technical Association of the Pulp and Paper Industry (TAPPI). The back side of the coated paper showed no passage of dye when 1.1 mil. turpentine containing an oil soluble red dye was dropped on a five gram mound of sand, which was placed on the coated side of the paper.

EXAMPLE II

Example I was repeated except that three layers of amylose were applied. An aqueous solution of amylose was prepared by heating to 155° C. a 9 percent solids aqueous slurry of 5.9 parts by weight corn amylose, 0.65 parts by weight corn amylopectin and 2.45 parts by weight polyvinyl alcohol having about two acetyl groups per each 100 monomeric units. The air-knife coating technique described in Example I was then employed to apply three separate layers of amylose to the same polyethylene structure with drying following each application.

The total of the amylose deposited was 3.1±0.3 pounds per each 1,000 square feet of polyethylene coated paper. The multi-ply structure had excellent grease-resistance by the TAPPI test. The oxygen permeability was 0.50 ccs./24 hours/100 square inches under one atmosphere of pressure.

EXAMPLE III

This example illustrates the extrusion of polyethylene onto amylose coated paper. An aqueous solution of amylose was prepared by heating to 155° C. a 10 percent solids slurry of 6.55 parts by weight corn amylose, 0.65 parts by weight corn amylopectin and 2.7 parts by weight polyvinyl alcohol having about two acetyl groups per each 100 monomeric units. The solution was continuously supplied to a non-water absorptive applicator roll of an air-knife coater, the roll being partially immersed in the solution maintained in coating pan. The amylose composition, which was in an ungelled state, was transferred from the surface of the roll to natural kraft paper web, which was moving at 250 feet per minute. Immediately thereafter, before the overlying amylose composition gelled, the coating was smoothed by passing the paper web between a roll surface and an air blast from a jet (air knife). The coated paper was dried and rerolled. To some of the coated paper a second coating of amylose was applied in the same way to the coated side of the paper and the paper again dried and rerolled. The total amylose deposited on the twice-coated paper was approximately 2 pounds per 1,000 square feet of paper, while the amylose on the singly coated layer weighed about 1 pound per 1,000 square feet of paper.

Each roll of amylose coated paper was coated on the amylose side with approximately 0.75 mil polyethylene film (3.67 lbs. of polyethylene per 1,000 square feet of paper). A polyethylene coating was extruded at 321° C. on to the paper web, which was moving at 230 feet per minute. There was a 4-¾ inches air gap between the extruder die and the nip formed between the chill roll and a rubber roll. The chill roll was maintained at between 33° to 37° C. and the nip pressure was 70 lbs. per lineal inch. After passing through the nip the coated paper was rewound.

The paper bearing the single amylose layer of about 1 pound per 1,000 square feet of paper had an oxygen permeability of 13.3 cc./24 hours/100 square inches under one atmosphere of pressure as measured on a Linde Volumetric Cell. The paper bearing the double amylose layer of about 2 pounds per 1,000 square feet of paper had an oxygen permeability of 4.3 cc./24 hours/100 square inches under one atmosphere of pressure.

Both multi-ply structures passed the grease-proofing test described in Example I. In each case the penetration of the turpentine and dye into the exposed polyethylene surface was clearly visible. However, the backside of the paper showed no passage of dye.

Essentially the same results are obtained by extruding the polyethylene onto the uncoated side of the amylose coated paper webs.

The complete disclosures of the applications and patents referred to in the body of this specification are incorporated herein by reference.

Since many embodiments of this invention can be made and since many changes may be made in the embodiments described, the foregoing is to be interpreted as illustrative only and our invention is defined by the claims appended hereafter.

We claim:

1. A water-resistant, grease-resistant, oxygen-resistant multi-ply structure, which comprises bonded together a paper base, a smooth, uniform, continuous layer of polyethylene and a smooth, uniform, continuous amylosic layer, wherein at least one surface of said paper base is bonded to a polyethylene subbing layer and a smooth, continuous, uniform, water-insoluble retrograded amylosic layer is bonded to said polyethylene subbing layer, said amylosic layer weighing at least 0.75 pounds per 1,000 square feet of paper and comprising an amylaceous material having at least 75 percent by weight amylose.

2. The article of claim 7, wherein said amylosic layer is bonded directly to said polyethylene subbing layer.

3. A water-resistant, grease-resistant, oxygen-resistant multi-ply structure, which comprises bonded together a paper base, a smooth, uniform, continuous layer of polyethylene and a smooth, uniform, continuous amylosic layer, wherein at least one surface of said paper base is bonded to an amylosic subbing layer and a continuous, uniform, smooth layer of polyethylene is bonded to said amylosic subbing layer, said amylosic subbing layer weighing at least 0.75 pounds per 1,000 square feet of paper and comprising an amylaceous material having at least 75 percent by weight amylose.

4. The article of claim 3, wherein said polyethylene layer is bonded directly to said amylosic subbing layer.

5. The article of claim 3, wherein said amylosic layer comprises a water-insoluble layer of retrograded, underivatized amylose plasticized with polyvinyl alcohol.

* * * * *

UNITED STATES PATENT OFFICE
CERTIFICATE OF CORRECTION

Patent No. 3,661,697 Dated May 9, 1972

Inventor(s) Ellsworth E. Kimmel; Austin H. Young

It is certified that error appears in the above-identified patent and that said Letters Patent are hereby corrected as shown below:

Column 5, line 36, for "polyethylene The" read ---polyethylene. The---
Column 8, line 27, for "article of claim 7" read ---article of claim 1---

Signed and sealed this 27th day of March 1973.

(SEAL)
Attest:

EDWARD M.FLETCHER,JR.
Attesting Officer

ROBERT GOTTSCHALK
Commissioner of Patents